United States Patent
Dean et al.

[11] Patent Number: 5,988,513
[45] Date of Patent: Nov. 23, 1999

[54] RE-WRITABLE DISPLAY DEVICE AND SYSTEM INCLUDING A CARRIER HAVING HUMANLY LEGIBLE CHARACTERS AND AN INDEXING TRACK

[76] Inventors: Robert Dean, Locks House, Locks Lane, Wantage, Oxon, OX12 9EH; Raymond Bennett, Pastures Cottage, Boarstall, Bucks, HP18 9UX, both of United Kingdom

[21] Appl. No.: 08/828,955

[22] Filed: Mar. 28, 1997

[51] Int. Cl.⁶ .................................................. G06K 19/06
[52] U.S. Cl. ...................... 235/494; 235/487; 235/460; 235/462.01
[58] Field of Search .................... 235/494, 487, 235/462.1, 462.01, 460

[56] References Cited

U.S. PATENT DOCUMENTS

| | | | |
|---|---|---|---|
| 4,605,846 | 8/1986 | Duret et al. | 235/494 X |
| 4,786,940 | 11/1988 | Daniele | 235/494 X |
| 5,055,662 | 10/1991 | Hasegawa | 235/492 |
| 5,471,044 | 11/1995 | Hotta et al. | 235/494 X |
| 5,621,515 | 4/1997 | Hoshino et al. | 235/494 X |
| 5,712,473 | 1/1998 | Nagashio | 235/494 |

FOREIGN PATENT DOCUMENTS

| | | |
|---|---|---|
| 0473403 | 4/1992 | European Pat. Off. . |
| 63-197067 | 8/1988 | Japan . |
| 1144180 | 6/1989 | Japan . |
| 1158585 | 6/1989 | Japan . |
| 310393 | 1/1991 | Japan . |
| 359788 | 3/1991 | Japan . |
| 4340689 | 11/1992 | Japan . |
| 5298501 | 11/1993 | Japan . |
| 2161425 | 1/1986 | United Kingdom . |
| 2199684 | 7/1988 | United Kingdom . |
| 2218041 | 8/1989 | United Kingdom . |
| 2271316 | 4/1994 | United Kingdom . |
| 8700945 | 2/1987 | WIPO . |
| 9302429 | 2/1993 | WIPO . |

*Primary Examiner*—Michael G Lee
*Attorney, Agent, or Firm*—Robert W J. Usher

[57] ABSTRACT

A data card or display device has a display region of non-volatile, display medium, which is re-writable with humanly legible characters and an indexing track composed of a machine readable, coded pattern of indicia is marked along a datum edge thereof. A read-write terminal has a read head aligned with the indexing track and a write head which includes individual write elements extending laterally of a path of travel of the card or display device therethrough, thereby to erase and write pixels forming humanly legible characters at preselected longitudinal positions on the display region determined by indicia of the indexing track as detected by the read head. The pattern of indicia comprises two rows of identical, repeating indicia displaced by one quarter pitch.

9 Claims, 6 Drawing Sheets

ENLARGED SECTION THROUGH A - A

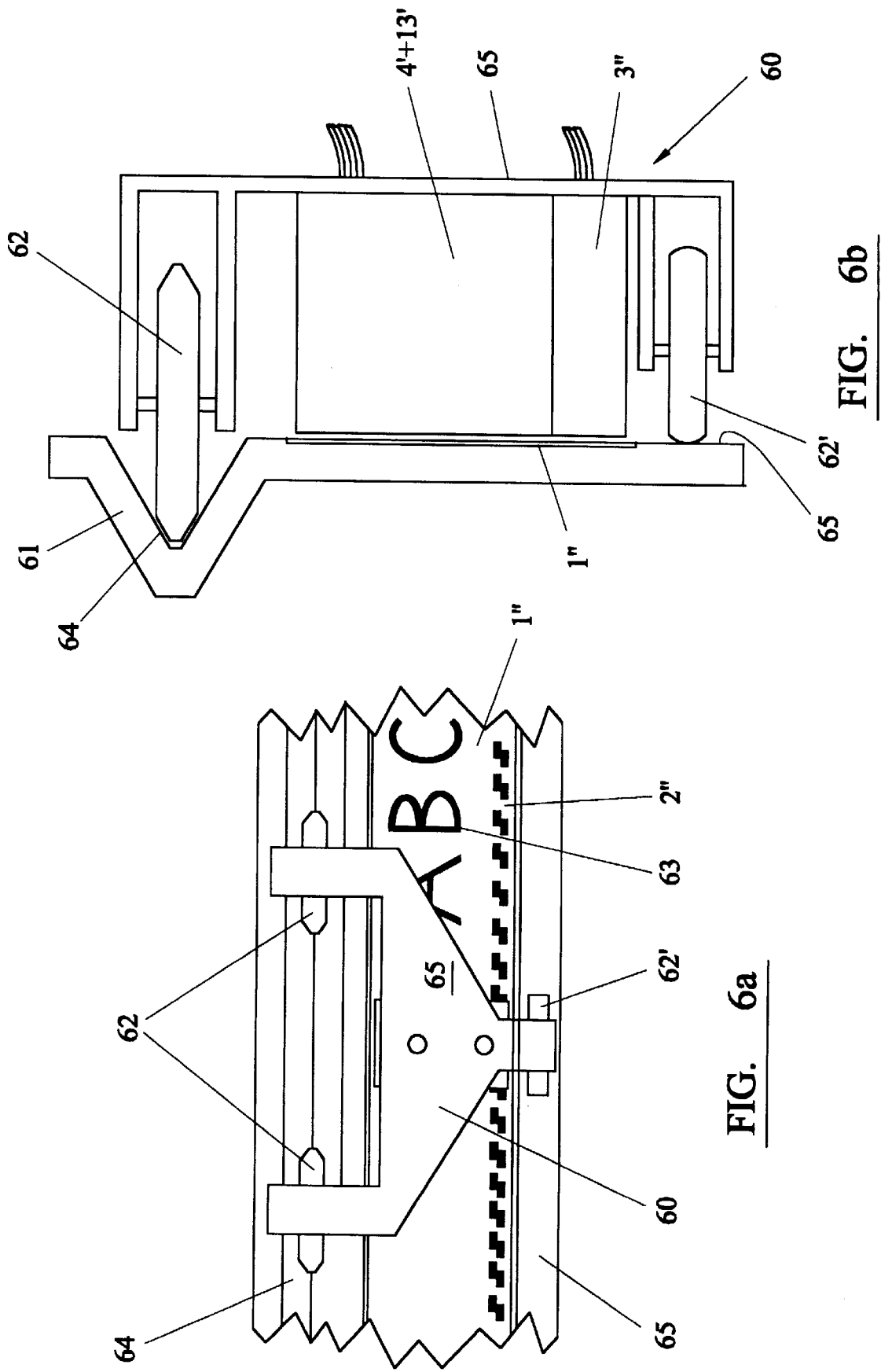

RE-WRITABLE DISPLAY DEVICE AND SYSTEM INCLUDING A CARRIER HAVING HUMANLY LEGIBLE CHARACTERS AND AN INDEXING TRACK

FIELD OF THE INVENTION

This invention relates to non-volatile visible displays and to apparatus and methods for clearing and writing to such displays with reference to a formatting scale spatially fixed in relation to a carrier on which the display is mounted.

BACKGROUND OF THE INVENTION

The requirement to provide an alterable display of data or graphical representation in locations where no power is available, or is only intermittently available, has existed for some time. For example in cashless payment systems such as are used for vending and payphones, where magnetic or optical cards are used to store value, the credit remaining on the card can only be read during the time it remains inserted in a terminal device with display capability. At all other times the value and any other data on the card is invisible. Users of such cards would find it advantageous to be able to see at any time the remaining value of the card.

Developments of smart (integrated circuit) card technology for cashless payment and other applications requiring enhanced data storage capacity and security capability have highlighted the need to be able to display some of the variable data stored electronically on the types of card commonly used in such applications or data from an external source. Requirements include; the need to write data in alignment with fixed characters printed on the card, for example a currency symbol; writing multiple fields of data accurately in relation to descriptors printed on the card, for example 'remaining credit', 'last transaction', 'appointment date', 'service due date'; to be able to modify the display to reflect changes in the value of the data recorded on the card and to provide the display function on thin cards similar to the common credit card which typically carry no energy source. Applications of smart cards are being developed to extend use from credit and debit to stored value functions and the electronic purse concept where the user may need to refer to the remaining value or values and other data on the card plus data from some other source in the absence of a terminal device with display capability. Other possible applications of non-volatile displays exist where costly permanent printing is periodically discarded and a new display installed. For example, product, price and bar code displays mounted on supermarket shelving units are from time to time required to be changed. Non-volatile re-writable display devices would offer a low cost, re-usable alternative.

There are known display materials which are responsive to magnetic fields or heat to reversibly produce contrasting light and dark areas such that with proper formatting any alpha or numeric character can be written or any graphical shape may be drawn with a suitable write mechanism. However, unlike electrically driven displays such as are typically found incorporated in battery operated calculators, remote controllers and similar devices, in which the display formatting framework is predetermined in manufacture, the magnetic field or heat sensitive display materials have no formatting framework and no integral means of self clearing and re-writing. A write mechanism must be provided, for convenience mounted in a card terminal or similar device, such that as the display is moved relative to the write mechanism, appropriate magnetic or heat stimuli are generated using electrical signals derived from stored data together with electrical power from the terminal device which may be either battery-or mains operated. The spatial formatting of characters to be written on the display is determined in a first dimension by the pitch of individual writing elements of the writing mechanism and in a second dimension by a measuring scale. Such scales may be part of the terminal device driven by frictional contact with the display material or display carrier. However such an arrangement has the disadvantage that card or carrier thickness variations cause variable frictional contact resulting in variable character formatting and positioning. A further disadvantage is that wear in the terminal devices will also cause variable formatting and positioning of characters. Yet a further disadvantage is the requirement for the terminal device to incorporate a large number of moving parts subject to wear and failure.

EP 0473403A2 published in 1992 discloses a card with an erasable re-writable medium used in apparatus which comprises an array of write heads and relies on drive rollers to position the card under the control of card positioning sensors which only detect the position of the card. There is no teaching of markings on the card to define the subsequent card location in the apparatus and the problems of writing to small or discrete write zones where precise positioning is necessary either to coincide with preprinted characters or to avoid destructive overlaps at edges of the fields. Evidently, reliance is placed on the provision of a relatively vast area of re-writable material covering the entire card face so the latter problem is not addressed.

WO 87/00945, published 1987, addresses the problem of transferring optical disk technology to a wallet size data card of 0.25 meg. capacity. The data is optically (re)written in minute, binary form by a 25 micron laser spot which cannot be confused with humanly legible characters. The references teaches reference position information on the recording strip, but only for guidance and definition of specific zones for different information, a well known disk formatting approach for defining data clusters, not to identify individually written humanly readable character locations.

GB 2161425A, published 1986, teaches a formatted data card which is not re-writable but only has provision for decrementing stored value sites so small (10×8 micron,) as to be effectively illegible. as the optical system follows a servo track and reads calibration marks. Reliance is placed on a grating system for interpolation between the calibration marks to adjust for card movement error in the environment of use showing that specific read/write sites are not sufficiently defined by markings on the card alone.

GB 2199684A, published 1988, teaches another system for writing and reading minute optical date on a formatted date card relating date records to control records which are placed on the card in an essentially arbitrary manner. The problem of accurately locating individual humanly legible characters is not addressed.

Although GB 2218041A, published 1989, is teaches provision of humanly visible markings aligned with a graticule, they are not erasable or re-writable with different values but are irreversibly changed to indicate that only fixed value has been used. They are in only linear array and the concept of forming a two dimensional graphical character is not addressed.

In so far as they may be relevant, the disclosures of the above are incorporated herein by reference.

SUMMARY OF THE INVENTION

An object of the invention is to overcome at least some of the above-mentioned disadvantages by providing a measuring scale or indexing track mounted integrally with an erasable, re-writable display material fixed to a carrier with a longitudinal axis of the scale parallel to a direction of movement of the carrier relative to the terminal device so that humanly legible or graphic characters may be reliably and accurately positioned in spatial relationship to the carrier and other legible matter, particularly other characters, permanently marked on the material or on the carrier, and the writing mechanism may be constructed with a minimum of moving parts.

According to the present invention there is provided an unformatted display medium, capable of accepting stimuli to create and maintain contrasting patterns of light and dark areas to form humanly recognizable characters or graphics, a writing means for stimulating said display medium, to erase old characters or graphics and write new and, integrated in the plane of said display medium, a coded pattern of indicia comprising a scale formed from materials resistant to damage, corruption and degradation to provide first dimensional spatial formatting and direction of travel information to said writing means for precise and repeatable positioning of said contrasting areas. A second dimension orthogonal to the axis of said coded pattern and in the plane of said display medium is formatted by the construction of said writing means in which the magnetic field or heat stimulating transducers are fixed in relation to mechanical guiding features constraining the lateral position of a datum edge of the display carrier as it moves relative to the writing means longitudinally parallel to said coded pattern.

Thus, the permanent indexing track provides a continuous position reference for a write head passing linearly over the medium while the write head has an array of writing elements extending across the direction of movement for writing a plurality of precisely positioned, visible sequences of erasable marks in a single pass, making a string of humanly legible characters.

The widths and spacings of the writing elements on the write head (which need not be equal) and the smallest linear intervals definable by the indexing track combine to define a two dimensional array of pixels (with no interpolation or length of travel measure or other means being required for defining smaller longitudinal distance units). Consecutive pixels may be merged by a write element remaining ON while the write head moves along the medium.

A typical smallest array of write head elements is five, consisting of dot-dash-dot-dash-dot which enables the well known seven segment numeral set to be legibly written with the dots marking a linear element in the direction of travel and the dashes a transverse linear element resulting in any selected numeral (0–9).

BRIEF DESCRIPTION OF THE DRAWINGS

Specific embodiments of the invention will now be described by way of example only and with reference to the accompanying drawings in which:

FIG. 4b is an enlarged schematic cross-sectional view taken along line I—I of FIG. 4a;

FIGS. 6a and 6b are, respectively, diagrammatic plan and side views of a shelf edge label writing system; and, FIG. 7 is a flow chart of the sequence of operations of the system.

DESCRIPTION OF PARTICULAR EMBODIMENTS

Figure 1:
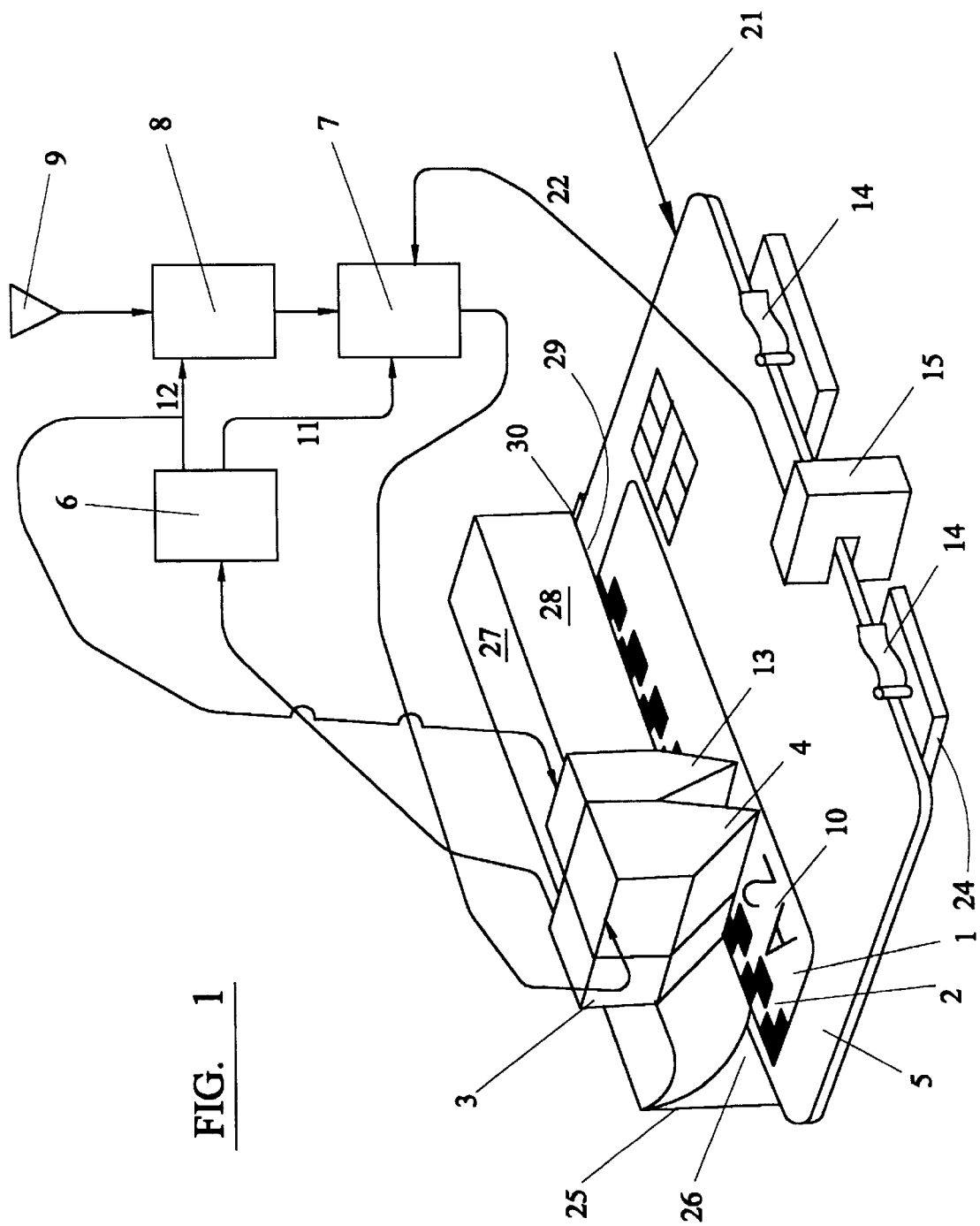
FIG. 1 is a schematic isometric view of a card reading and writing system with elements thereof shown in block diagram form.
Figure 2:
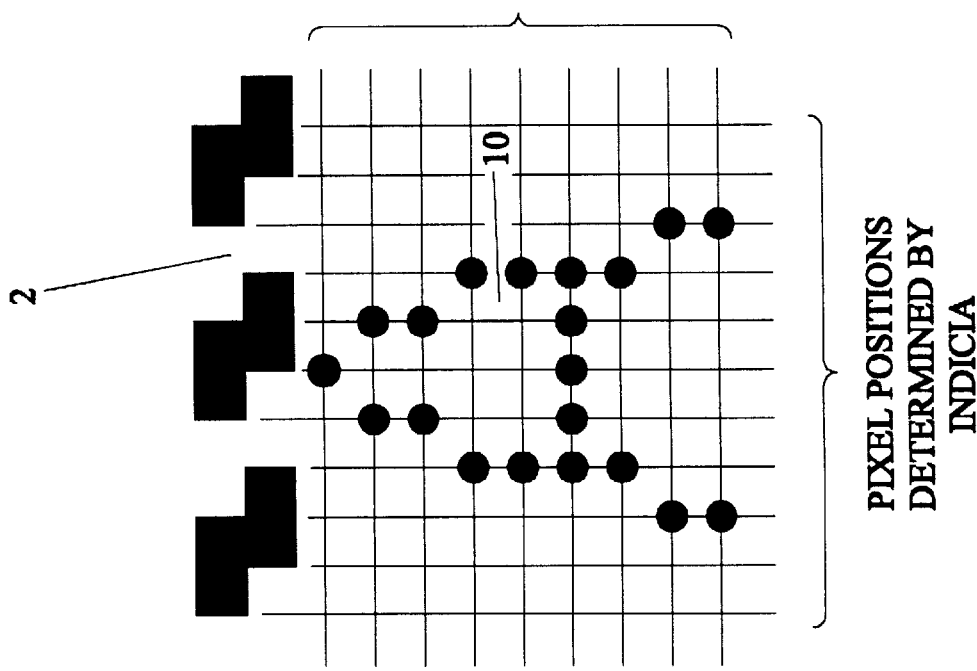
FIG. 2 is a schematic view of a portion of the carrier shown in FIG. 1 marked with a reference grid showing pixel positions determined by the print indicia and print head respectively.

FIG. 1 show a strip of material 1 encapsulating liquid crystal in a matrix sensitive to magnetic fields and fixed by adhesive to a plastic card 5. Next to the liquid crystal matrix material 1 are alternate reflective and non-reflective indicia 2 printed in two rows on the strip parallel to a longitudinal edge. The pitch of the indicia shown is arranged to be twice the pitch of contrasting light or dark areas required on the display 1 to generate characters 10. The two rows of indicia 2 are arranged to be displaced by one quarter of a pitch as illustrated in FIG. 2. As the strip of display material 1 and spatial definition indicia 2 are laminated to the plastic card 5, the pattern of indicia is precisely positioned to fix the position of written display characters 10 relative to the card outline.

The terminal or read/write device comprises a card guiding frame having a horizontal card supporting wall 24 from one longitudinal edge of which upstands a card guide datum wall 25 which extends in the direction of card travel. Springs 14 mounted on the lateral extensions of the supporting wall 24, hold the longitudinal datum edge of the card in contact with a datum guide face 26 of the datum wall 25. A bridging wall 27 joins the upper edge of the datum wall 25 to a frame wall 28 which depends, parallel with the datum wall, to a short distance above the supporting wall 24 defining therewith a card receiving slot 29 maintaining the card against the supporting wall in a flat plane of travel. A portion of the frame forms a card stop 30 at one end of the slot 29 and is associated with a card edge sensor (not shown).

Figure 3:
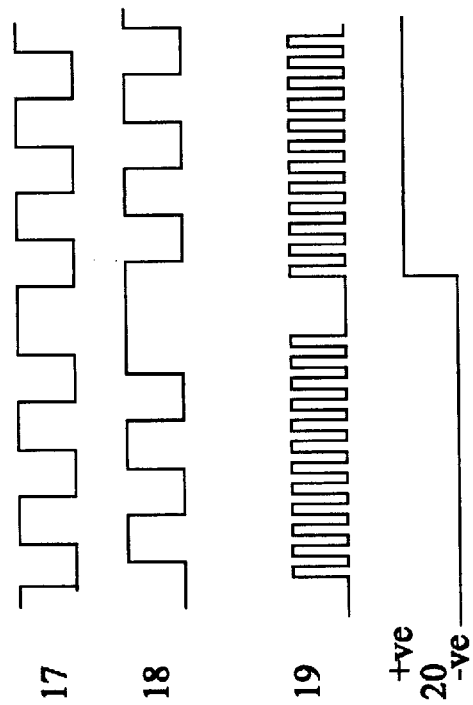
FIG. 3 show pulse trains generated by signal processing circuits of the system.
Figure 5A:
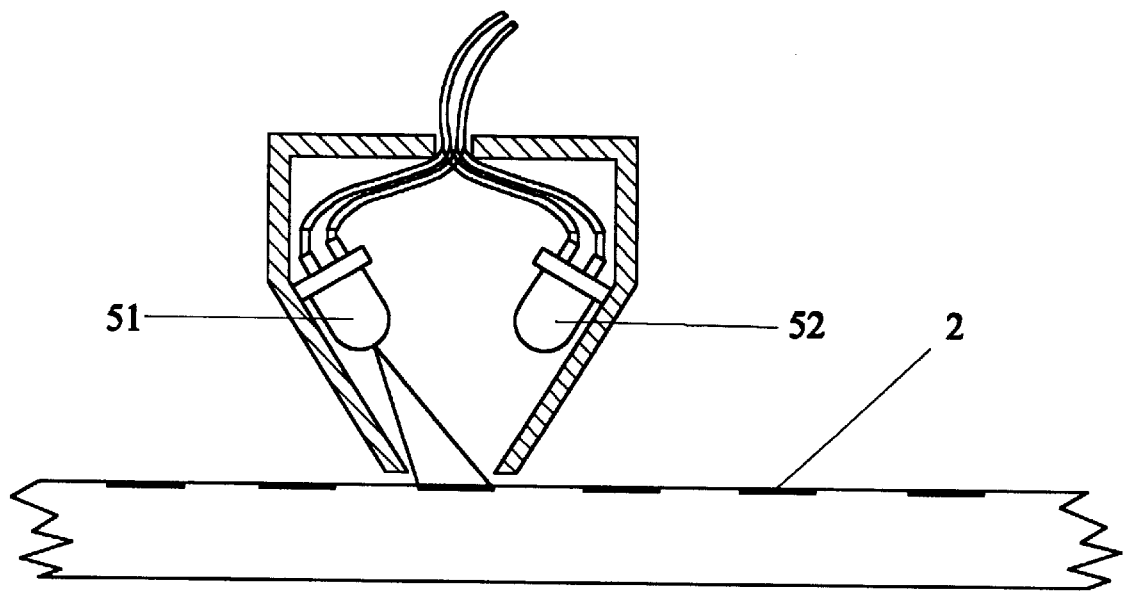
FIG. 5a is a schematic view of one of two indicia detectors for detecting position and direction of travel of the carrier.
Figure 5B:
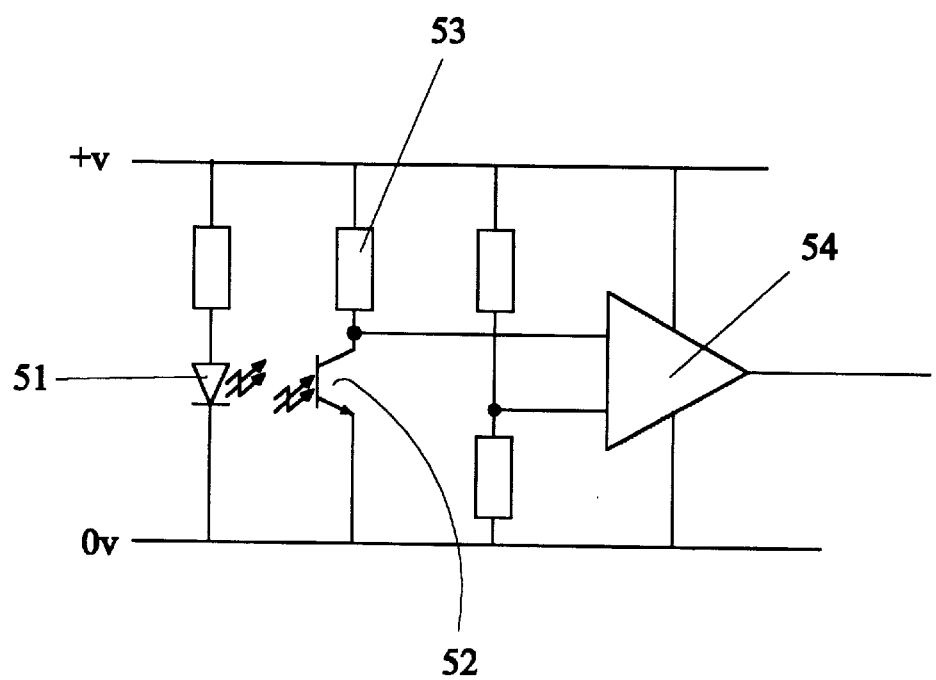
FIG. 5b is a diagram of a circuit for processing signals generated by an indica detector.

A read head 3 including two photo detectors 52, one for each row of indicia 2, is integral with a writing head 4 and has a housing fixed to depending frame wall 28. The photo detectors provide electrical signals indicative of either reflective or non-reflective surfaces. Signal processing circuits 6 shown in FIG. 5b detect the transition from reflective to non-reflective or non-reflective to reflective indicia to produce electrical pulses 19 as shown in FIG. 3 being the combination of all transitions from both pulse trains 17 and 18 derived from read heads 3, indicating to drive circuits 7 the correct positions for the application of write stimuli to the display material 1. Additionally, using well known techniques, the signal processing circuits 6 create a further signal 12 comprising a high or low level 20 indicative of the direction of travel relative to the indicia 2. As shown in FIG. 5a, two narrow beam light sources 51 illuminate the respective rows of indicia. The wavelength of light is not critical and, for low cost and relative immunity to stray visible light, an infra-red source would normally be chosen. The two photo-detectors 52 have a narrow field of view and are arranged so that they detect only light reflected from two rows of indicia conducting high and low currents corresponding to indicia portions of high and low reflectivity, respectively, which is converted to a voltage, in the circuitry shown in FIG. 5b, by resistors 53 connected in series, and the resulting voltage compared with a threshold level using a comparator 54 producing a logical signal indicative of a black or white rectangular area, as shown in FIG. 3 at 17 and 18, respectively.

Integral with the read head 3 is a write head 4 comprising an array of 9 electromagnets arranged to switchably generate nine cylindrically shaped magnetic fields perpendicularly intersecting the plane of the display medium 1. At the position where a cylindrically shaped magnetic field intersects the display medium 1, a circular dark area is generated which remains dark after the removal of the magnetic field. Control circuits 7 switch electrical current selectively to the electromagnets to either create a dark area on the display medium 1 when current flows or to leave the display medium 1 light when no current flows. In addition to and fixed to the write head, an erase head 13 comprising a switchable electromagnet producing a magnetic field parallel to the display medium 1 and the same width as the write head 4, is switched on by direction of travel signal 12 during the write stroke, the direction of which is indicated by arrow 21. A photo detector 15 is mounted to the card supporting wall 24 for sensing the edge of a card, producing a signal 22 to initiate writing at a predetermined position relative to the edge of the card 5.

As the card 5 is moved relative to the write head 4, photo sensors 3 detect the indicia 2 and signal to the write head 4, via signal processing circuitry 6 and write head drive circuitry 7, the positions where contrasting areas may be written according to a predetermined pattern representative of humanly readable characters stored in memory 8. In this way a representation of characters or graphical shapes demanded by an external source 9 may be generated within a predetermined area and with predetermined feature sizes on the substantially unformatted display medium 1. The data source 9 may conveniently be the integrated circuit memory mounted on the card or any other suitably connected and controlled electronic memory incorporated in or external to the write mechanism.

The card terminal comprising the means to read and write the information held electronically on the card 5 and the erase/write head assembly 3, 4 and 13 would normally be mounted in a protective enclosure formed with a card entry slot. Preferably, electric motor driven friction wheels (e.g forming a nip) is provided to effect card insertion but both insertion and removal can be entirely manually as the velocity of travel need not be constant as the exact position of the card at any time is determinable by the indexing track or indicia.

Figure 7:
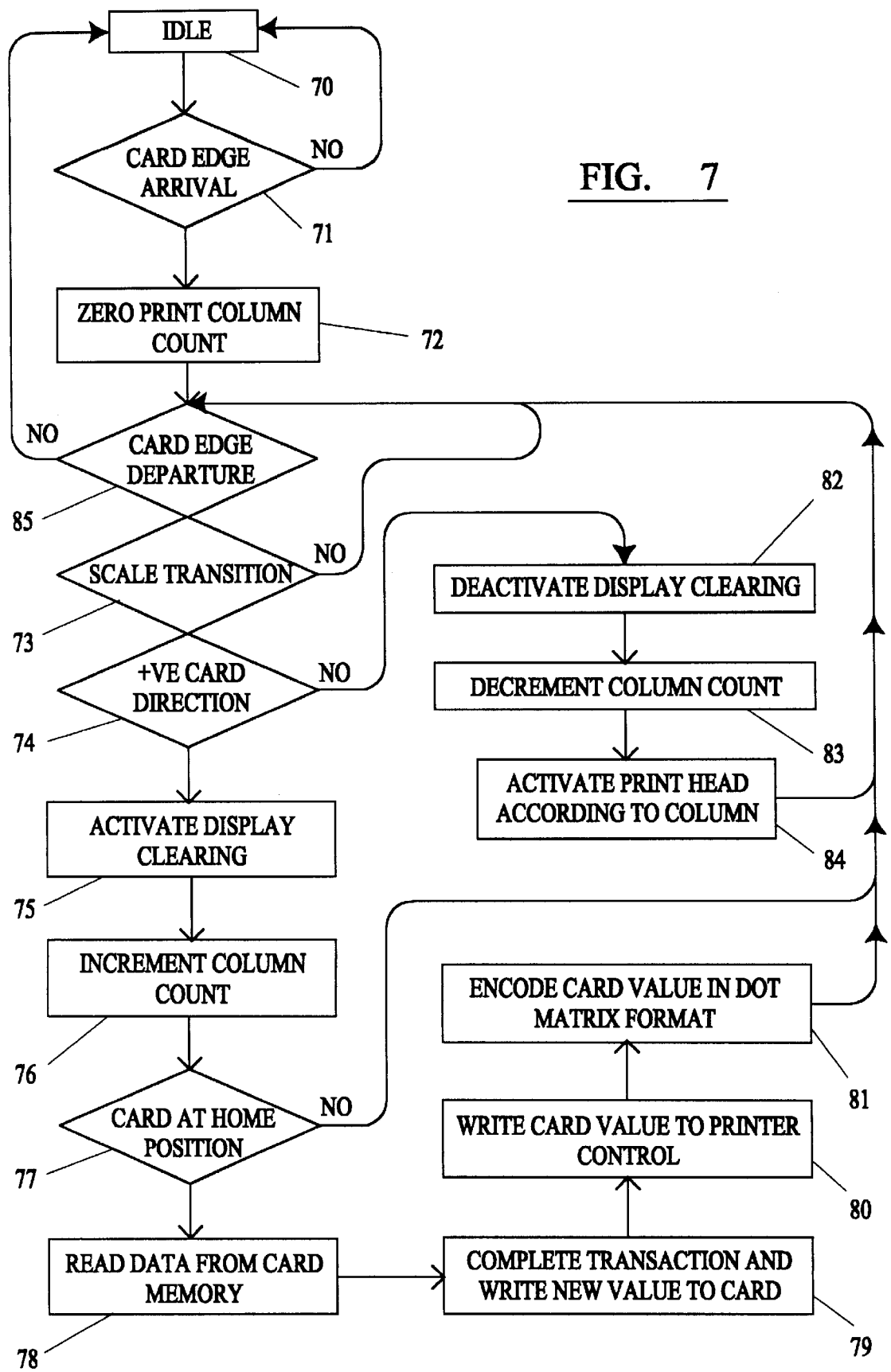

The operational sequence is shown in the flow diagram of FIG. 7. In the state of operational readiness, the printer control is idle waiting for the arrival of a card as shown by block 70. If a card edge is detected by the photo detector 15, as shown at block 71, the column counter for initiating printing of each column of dots, is cleared to zero as shown by block 72. At block 73, if a light to dark and dark to light transition of the coded scale is detected by a photodetector a pulse for each is generated as shown at 19 in FIG. 3. A simple logic function with the 2 coded scale photo detectors as inputs determines the direction of travel of the card. (The signals are shown in FIG. 3 at 17,18,19 and 20) and, if positive, as shown by block 74, power is applied (block 75) to the display wiping head shown in FIG. 1 at 13, and, as shown by block 76, +1 is added to a counter which keeps account of the position of the write head (FIG. 1 at 4). If the card reaches home position end stop 29, where communication between card and terminal takes place, the sensor sends a signal to the print controller, as shown by block 77 and, with the card at the end stop position, data is read from the card by a communication system not described in detail, as shown by block 78. The data may consist of security and authentication coding as well as the value stored in the card's memory. The data read from the card is processed by the terminal control system in completing a transaction, as shown by block 79, where the price for the transaction is deducted from the value read from the card and the new, remaining value is written back to the card. As shown by block 80 the terminal control system also sends the new remaining card value to the printer controller (for convenience in binary coded decimal format). Each of the card value numeral codes is translated using a look-up table into a matrix of dots which are stored as an addressable sequence of coded dot columns as shown by block 81. If the card edge direction is negative, as shown by block 74, the display wiping head (FIG. 1 at 13) is switched off as the card begins to be ejected, as shown by block 82. Detection of a negative scale transition causes the card position counter to be decremented by +1, as shown by block 83 and the print head (FIG. 1 at 14) printing needles are pulsed in accordance with the coded pattern for the particular column being addressed, as shown by block 14. (The pattern concerned was loaded into memory during the translation of binary coded value digits into dot matrix format).

If departure of the card edge is detected, as shown by block 85, when the card is withdrawn from the reader, the control is returned to the wait state or idle. States 85 and 73 together are a wait state which is active for as long as a card is in the reader.

Encoding the card value in dot matrix format includes the inter-character spaces.

When no card is in the reader terminal the printer control only looks for the arrival of a signal indicating that a card has been inserted. The flowchart describes a process whereby any printing on the card as it is inserted in the terminal is wiped as the card is transported to the home position. On ejection the new card value is printed on the display material on the card. An alternative mode of operation is possible whereby the existing printing is wiped and the new value printed on the card on the same ejection stroke. In this case 'display clearing' is activated during negative travel of the card at the same time as, and just ahead of characters as they are being printed. This alternative mode of operation may be desirable to avoid clearing the display before it is known that value can be read from the card. If the card is defective it is desirable to retain the visual indication of value remaining when the card failed.

Figure 4A:
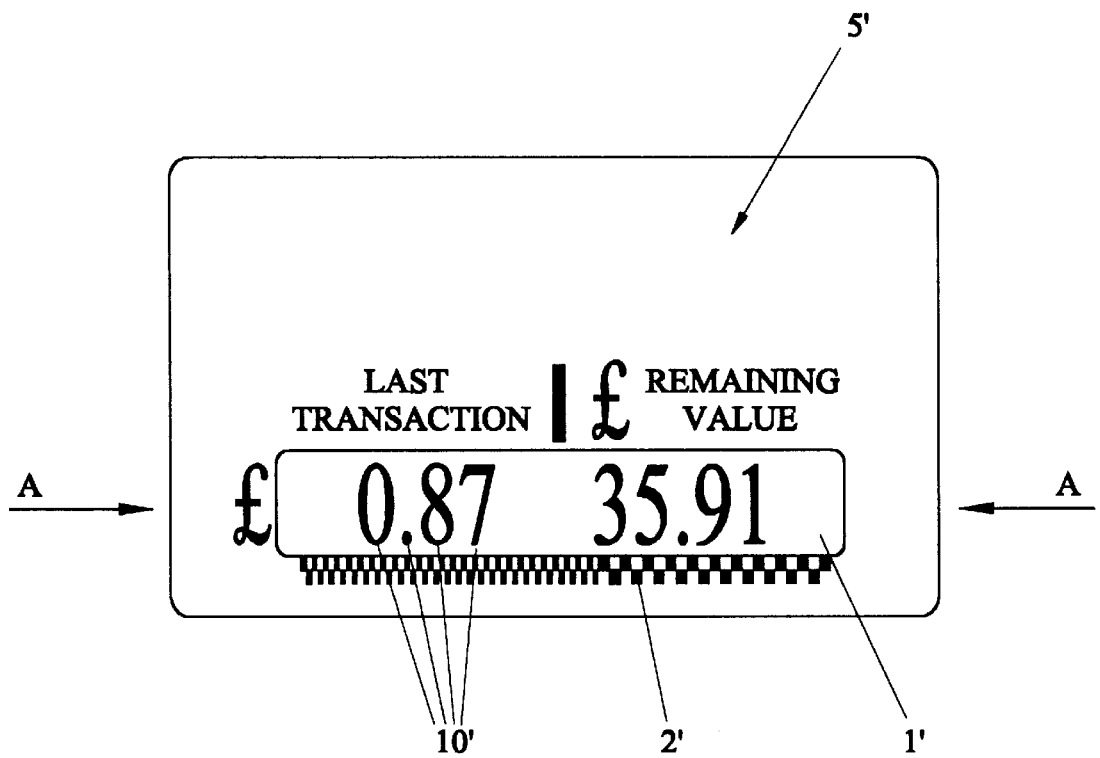
FIG. 4a is a schematic plan view of a card mounted with a display film.
Figure 4B:
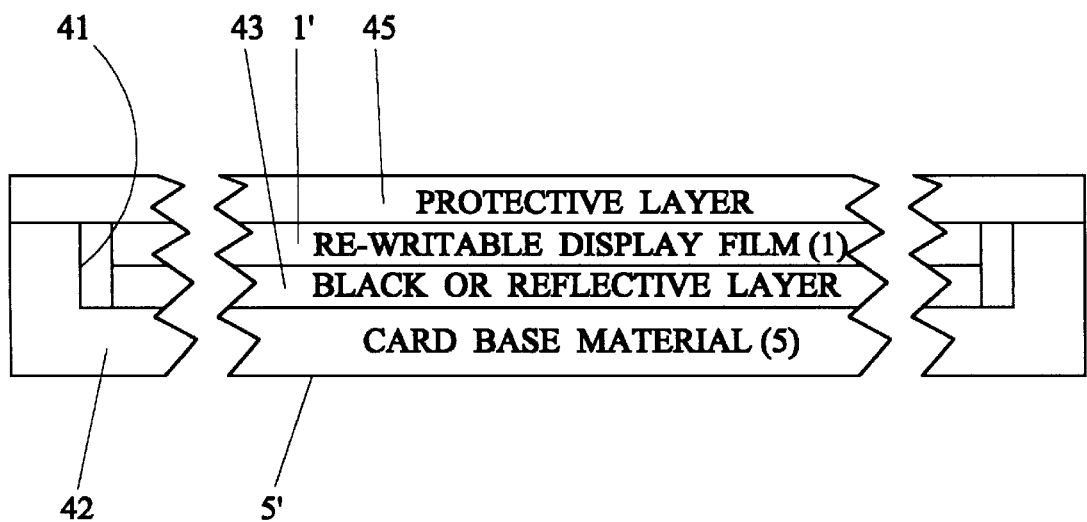

In an alternative embodiment shown in FIG. 4a and 4b, the strip of display film 1' is mounted in a recess 41 in the plastic card base material 42. A black or reflective layer 43 underlies the display film 44 to provide contrast for those areas of the display film which are transparent. A transparent protective film overlies the display film. As shown, the card is of the stored value type required to display to the card holder the value of the last transaction in the left hand field and the remaining value recorded on the card in the right hand field. A means for storing the value on the card is not shown but could be a semiconductor memory chip, a magnetic stripe or other suitable machine readable memory means.

Alternative, known techniques for providing the machine readability for the indexing track, may be used, such as alternate areas of high and low dielectric constant, in conjunction with capacitive sensors. Another possibility is alternate areas of high and low permeability in conjunction with magnetic sensors.

Shapes other than rectangular may be used for the machine readable indicia 2 to define alternative formats and sizes of contrasting areas on the display. Squares, circles, ellipses or complex shapes may be used without affecting the principle of operation.

Other types of non-volatile, re-writable display I are known to be adaptable for application in the same way as described here. For example heat sensitive material wherein contrasting areas may be generated and a previous display pattern may be over-written by applying alternate heating and cooling cycles.

Suitable liquid crystal magnetically activated display film is commercially available from Dai Nippon Printing Co Ltd., Japan, while a suitable heat sensitive material is available commercially from Toppan Co., Ltd., Japan.

The write head described comprises 9 electromagnets as display stimulating transducers being a convenient number for good character definition. Any number of transducers may be employed and activated in any combination without affecting the principles of the invention.

Indicia are shown and described for convenience mounted next to the display medium. Indicia could be mounted parallel to the datum edge of the display carrier and in any location without affecting the principle of the invention.

The erase head is described as being switchable in the above embodiment. In other applications a suitably mounted non-switchable erase head may be employed without affecting the principle of the invention.

A shelf edge labelling system shown in FIG. 6a and FIG. 6b, comprises a label forming indexed display strip 1" of non-volatile re-writable material which can be of several meters length and two or three centimeters wide, for example, according to the specific application, mounted, by adhesive, in a recess in a shelf edge label carrier 61 of corresponding length and an erase/write device 60 mounted for wheeled travel therealong. Data storage and control circuits necessary for information to be printed on the label are omitted for clarity.

The label carrier 61 is a one piece strip with a guideway comprising a V-section groove 64 and a pathway 65 extending continuously therealong adjacent upper and lower side edges thereof, above and below the display strip 1". The erase/write device 60 has a frame 65 forming a carriage for erase and write sections 13' and 4' and the optical sensing head 3" which are mounted on a central portion thereof. Upper and lower ends of the frame carry upper and lower wheels 62 and 62', above and below the erase/write head, the two wheels 62 being of larger diameter than the wheel 62' and having rims profiled for snug receipt in the groove 64 providing vertical stability while to guiding the erase/write and sensing sections linearly along the strip in predetermined respective positions vertically aligned with and adjacent surfaces of the unformatted and index portions of the display film, respectively, while the writing device is propelled by hand along the label carrier mounted on a shelf edge. Indicia 2" of the indexing track are detected by the optical sensing head to provide signals as described in relation to FIG. 5 to control circuits shown diagrammatically in FIG. 1. These position signals are utilized by the head control circuits to operate the erase/write heads to erase/write pixels in the correct (longitudinal) positions forming humanly readable graphical characters 63 which are juxtaposed with corresponding goods, on a supermarket shelf, for example.

Changes in description/prices/quantities etc of displayed goods can be reflected by re-writing corresponding locations of the display strip by simply advancing the erase/write device over the corresponding locations determined by the sensing head without need to remove the display strip from the shelf.

In practice, for most applications, the size of the groove providing portion will probably be considerably smaller than illustrated.

We claim:

1. A display device comprising a carrier having an end and having an elongate datum edge extending from said end, an unformatted, non-volatile, display medium, erasable and re-writable with humanly legible characters extending along the carrier and a spacial indexing track formed by a longitudinally continuous, permanent, coded pattern of indicia extending parallel to the datum edge on one of the carrier and the display medium which indicia are machine-readable, forming a formatting scale providing longitudinal coordinates for a writing means to write pixels on saiddisplay medium forming respective humanly legible characters.

2. A display device according to claim 1, wherein the coded pattern of indicia comprises two longitudinally extending rows of identical, repeating indicia each having a pitch, the indicia in one row being displaced longitudinally from the indicia in another other row by one quarter pitch so that a longitudinal direction of travel of the strip can be detected by indicia reading means.

3. A display device according to claim 2, wherein each row comprises alternating light and dark rectangular areas.

4. A display device according to claim 2, wherein each row comprises alternating light and dark rectangular areas.

5. A display device according to claim 1, wherein the indicia of the coded pattern of indicia are regularly spaced as they extend parallel to the datum edge.

6. A wallet size data card having a machine-readable, re-writable non-volatile store of invisible values and comprising a carrier substrate having an end and having an elongate datum edge extending from said end;

an unformatted, non-volatile, display medium, erasable and re-writable with humanly legible characters corresponding to the invisible values extending along the substrate;

and a spacial indexing track formed by a longitudinally continuous, permanent, coded pattern of indicia extending parallel to the datum edge on one of the carrier substrate and the display medium which indicia are machine-readable providing longitudinal coordinates for a writing means to write pixels on the display medium forming the respective humanly legible characters.

7. A wallet size data card according to claim 6, wherein the coded pattern of indicia comprises two longitudinally extending rows of identical, repeating indicia each having a pitch, the indicia in one row being displaced longitudinally from the indicia in another other row by one quarter pitch so that a longitudinal direction of travel of the strip can be detected by indicia reading means.

8. A wallet size data card according to claim 6, wherein the indicia of the coded pattern of indicia are regularly spaced as they extend parallel to the datum edge.

9. A display device comprising a carrier with an end and an elongate datum edge extending therefrom, an unformatted, non-volatile, display medium, erasable and re-writable with humanly legible characters, extending continuously along the carrier and an indexing track formed by a longitudinally continuous, permanent, coded pattern of machine readable indicia extending parallel to the datum edge on one of the carrier and the display medium, individual, humanly legible characters written on the display medium each character being formed by pixels placed at longitudinal positions corresponding to selected longitudinal coordinates formed by the indicia.

* * * * *